United States Patent [19]

Matsuoka

[11] Patent Number: 4,973,836
[45] Date of Patent: Nov. 27, 1990

[54] OPTICAL PICKUP DEVICE INCLUDING A BEAM SPLITTER HAVING AN INCLINED PLANE

[75] Inventor: Kazuhiko Matsuoka, Yokohama, Japan

[73] Assignee: Canon Kabushiki Kaisha, Tokyo, Japan

[21] Appl. No.: 483,966

[22] Filed: Feb. 15, 1990

Related U.S. Application Data

[63] Continuation of Ser. No. 174,978, Mar. 29, 1988, abandoned.

[30] Foreign Application Priority Data

Mar. 31, 1987 [JP] Japan .................................. 62-78019
Apr. 7, 1987 [JP] Japan .................................. 62-85269
Apr. 7, 1987 [JP] Japan .................................. 62-85270

[51] Int. Cl.$^5$ .................................................. G01J 1/20
[52] U.S. Cl. .............................. 250/201.5; 369/44.23
[58] Field of Search .............. 250/216, 201 PF, 201.5; 369/112, 44–46, 44.23

[56] References Cited

U.S. PATENT DOCUMENTS

| | | | |
|---|---|---|---|
| 3,628,027 | 12/1971 | Brauss | 250/216 |
| 4,607,359 | 8/1986 | Matsubayashi et al. | 369/112 |
| 4,731,527 | 3/1988 | Nomura et al. | 369/112 |
| 4,771,414 | 9/1988 | Yoshimatsu | 369/112 |
| 4,907,858 | 3/1990 | Hara et al. | 350/286 |

Primary Examiner—David C. Nelms
Assistant Examiner—Khaled Shami
Attorney, Agent, or Firm—Fitzpatrick, Cella, Harper & Scinto

[57] ABSTRACT

An optical pickup device in which, e.g., a semiconductor laser is used as a light source and light fluxes from the light source are irradiated onto an optical information recording medium, thereby performing either one of or both recording and reproduction of information into and from the recording medium is provided. The device includes: a light source to generate a light beam which is irradiated to the optical recording medium; a polarizing or non-polarizing beam splitter, arranged on the optical path from the light source to the recording medium and consisting of prisms, for transmitting the light beam from the light source and leading to the recording medium, and for separating the light reflected by the recording medium from the light beam from the light source; and photodetectors, arranged almost rectilinearly, for receiving the reflected light from the recording medium which is separated by the beam splitter, wherein among the planes of the beam splitter, the plane opposite to the plane which faces the direction of the photodetectors has a shape adapted to lead the light beam reflected by this plane to the direction which is almost perpendicular to the arrangement direction of the photodetectors. With this apparatus, the signals can be detected with a high S/N ratio.

34 Claims, 12 Drawing Sheets

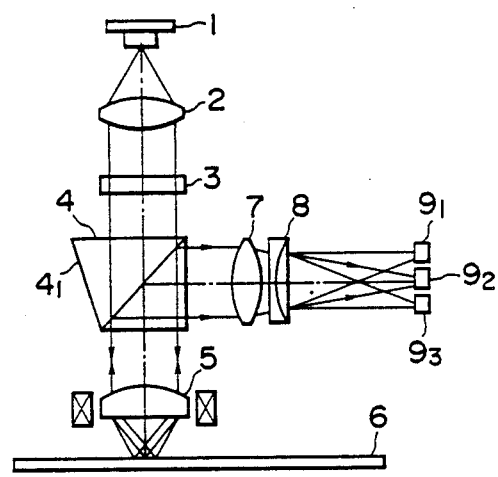
FIG.1
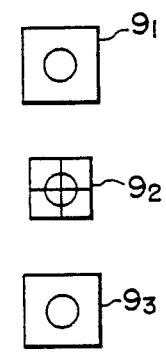
FIG.2
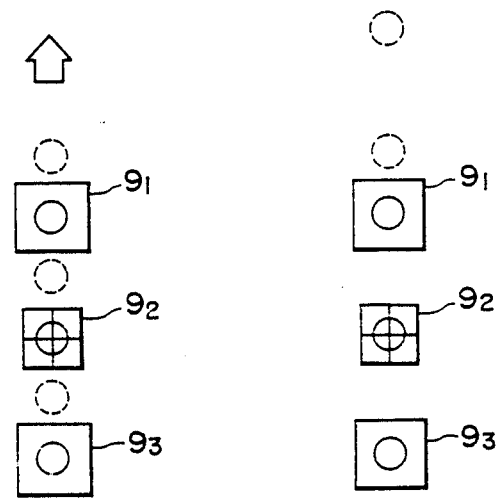
FIG.3(a)   FIG.3(b)

OPTICAL PICKUP DEVICE INCLUDING A BEAM SPLITTER HAVING AN INCLINED PLANE

This application is a continuation of application Ser. No. 07/174,978 filed Mar. 29, 1988, now abandoned.

BACKGROUND OF THE INVENTION

1. Field of the Invention

The present invention relates to an optical pickup having a semiconductor laser or the like as a light source in which a light flux from the light source is irradiated onto an optical information recording medium, therby performing either one of or both of recording and reproduction of information.

2. Related Background Art

According to an optical pickup for optically performing either one of or both of recording and reproduction, a light beam from a light source is converged to a microspot beam by an optical system and irradiated onto an information recording medium, and the light beam is intensity modulated by a recording signal, thereby changing an optical characteristic of the recording medium and recording information. On the other hand, the light beam of a weaker intensity than that upon recording is also converged to a microspot beam similar to the case of recording and irradiated onto the medium, and an optical change of the medium is detected, thereby reproducing information. An optical recording and reproducing apparatus using such an optical pickup has various features such that density of information can be raised and the like. However, when information is recorded and reproduced, a light beam is always converged into a microspot beam and irradiated onto an information recording medium, so that it is necessary to perform a focus control for keeping the distance between the information recording medium and the optical system constant and a tracking control for tracing the track on which information has been recorded. In general, in an optical recording and reproducing apparatus, in order to obtain an informtion signal when reproducing information by using a reflecting type disk, and in order to derive a control signal when performing the foregoing focus control and tracking control, the reflected light needs to be taken out of the information recording medium.

In general, a beam splitter is used to take out reflected light from the information recording medium. The light beam is directed onto the optical path from the light source to the recording medium by the beam splitter, the light of the light source is efficiently transferred to the recording medium and the light reflected by the recording medium is efficiently separated from the optical path, thereby detecting the information signal and control signal.

However, the conventional optical recording and reproducing apparatus using the beam splitter has a drawback such that a stray light which fairly decreases the S/N ratios of the information signal and control signal, particularly, a ghost light is generated by the beam splitter.

To solve this drawback, the applicant of this invention has proposed an optical pickup (U.S. Pat. No. 4,907,858: same assignee). According to this optical pickup, among six planes constituting the beam splitter, the plane opposite to the plane which faces the direction of a photodetector is set to the plane which does not reflect a light beam from a light source to the direction of the photodetector, namely, to the plane which is inclined for the direction of the photodetector, thereby preventing the ghost light. However, according to the beam splitter used in this optical pickup, in the case of using a plurality of photodetectors which are almost rectilinearly arranged as in a three-beam system, the light beam is influenced by a distribution shape of the reflected beam light fluxes, so that there is a problem such that the generation of the ghost light cannot always be prevented and the S/N ratio in detection of the signal deteriorates. This problem will now be described hereinbelow with respect to an optical recording and reproducing apparatus using the astigmatism system for the focus control and using the 3-beam system for the tracking control with reference to FIGS. 1 to 3(a) and 3(b). In FIG. 1, the light fluxes emitted from a semiconductor laser 1 are converted into parallel light fluxes by a collimator lens 2 and divided into three beams by a diffraction grating 3. The divided light beams are transmitted through a beam splitter 4 and converged onto a disk 6 by an objective lens 5, so that three beam spots are formed. The light beam reflected by the disk 6 again passes through the objective lens 5 and is reflected by the beam splitter 4 and separated from the incident beam. The reflected beam is converged by a condenser lens 7 and a cylindrical lens 8 and enters photodetectors $9_1$, $9_2$, and $9_3$. The photodetectors $9_1$, $9_2$, and $9_3$ are arranged so as to receive the lights from the three beam spots formed on the disk 6, respectively.

As shown in FIG. 2, the photo sensing surface of the photodetector $9_2$ is divided into four areas. By obtaining the difference between the sum of the detection signals of a pair of photo sensing surfaces arranged on a diagonal line and the sum of the detection signals of another pair, the astigmatism caused by the cylindrical lens 8 is detected. Thus, a focus control signal is derived by the well-known principle of the astigmatism system. On the other hand, in the case of reproducing information, a reproduction signal is derived from the photodetector $9_2$. Further, by calculating the difference between two detection signals of the photodetectors $9_1$ and $9_3$, a tracking control signal is obtained by the well-known principle of the 3-beam system.

FIGS. 3(a) and 3(b) show the states of the reflected beams on the photodetectors $9_1$, $9_2$, and $9_3$ in the case when a plane $4_1$ opposite to the plane which faces the direction of the photodetectors among six planes constituting the beam splitter 4 is inclined so as to avoid the ghost lights in the direction which is almost parallel with the arrangement direction of the photodetectors $9_1$, $9_2$, and $9_3$ in order to prevent the ghost lights from entering the photodetectors $9_1$, $9_2$, and $9_3$.

FIG. 3(a) is the diagram showing the case when the plane $4_1$ of the beam splitter is slightly inclined and the ghost lights are avoided at the intervals among the photodetectors $9_1$, $9_2$, and $9_3$. In this case, there is a large possibility of the occurrence of leakage of the ghost lights to the photodetectors $9_1$, $9_2$, and $9_3$ and the S/N ratios of the signals deteriorate. On the other hand, as shown in FIG. 3(b), there is also considered a method whereby the plane $4_1$ of the beam splitter is largely inclined to thereby largely deviate the ghost lights from the photodetectors $9_1$, $9_2$, and $9_3$. However, when the angle of inclination increases, there is a possibility that the light fluxes are further reflected by an optical column wall portion and the like in the way of the optical path and are irradiated onto the photodetectors $9_1$, $9_2$, and $9_3$, so that they become a cause of the occurrence of the ghost lights. To prevent this problem, a method whereby a large enough space is assured on the optical path is considered. However, according to this method, the size and weight of the optical pickup increase.

On the other hand, the foregoing problems also obviously occur in the case when two photodetectors are provided as in the well-known wedge prism system (focus control).

SUMMARY OF THE INVENTION

It is an object of the present invention to provide an optical pickup which can solve the foregoing conventional drawbacks and can detect signals with high S/N ratios.

According to the present invention, this object is accomplished by an optical pickup apparatus comprising: a light source for generating a light beam which is irradiated onto an optical recording medium; a beam splitter, arranged on an optical path from the light source to the optical recording medium and consisting of a junction of a plurality of prisms, for transmitting the light beam from the light source and leading to the optical recording medium, and for separating the reflected light from the recording medium from the light beam from the light source; and a plurality of photo sensing means, arranged almost rectilinearly, for receiving the reflected light from the recording medium which is separated by the beam splitter, wherein among planes of the beam splitter, the plane opposite to the plane which faces the direction of the photo sensing means has a shape adapted to lead the light beam reflected by the plane to a direction which is almost perpendicular to the arrangement direction of the photosensing means.

This object is also accomplished by an optical pickup apparatus comprising: a light source for generating a light beam which is irradiated onto an optical recording medium; a beam splitter, arranged on an optical path from the light source to the optical recording medium and consisting of a junction of a plurality of prisms, for reflecting the light beam from the light source and leading to the optical recording medium, and for separating the reflected light from the recording medium from the light beam from the light source; and a plurality of photosensing means, arranged almost rectilinearly, for receiving the reflected light from the recording medium which is separated by the beam splitter, wherein among planes of the beam splitter, the plane opposite to the plane which faces the direction of the light source has a shape adapted to lead the light beam reflected by the plane to a direction which is almost perpendicular to the arrangement direction of the photo sensing means.

This object is also accomplished by an optical pickup apparatus comprising: a light source for generating a light beam which is irradiated onto an optical recording medium; a beam splitter, arranged on an optical path from the light source to the optical recording medium and consisting of a junction of a plurality of prisms, for separating the reflected light from the recording medium from the light beam from the light source; and a plurality of photosensing means, arranged almost rectilinearly, for receiving the reflected light from the recording medium which is separated by the beam splitter, wherein among planes of the beam splitter, the plane opposite to the plane which faces the direction of the photosensing means is set to be almost parallel with the arrangement direction of the photosensing means and is set to an angle different from the direction which is vertical to an optical axis of the separated reflected light.

This object is also accomplished by an optical pickup apparatus comprising: a light source for generating a light beam which is irradiated onto an optical recording medium; a beam splitter, arranged on an optical path from the light source to the optical recording medium, for leading the light beam from the light source to the optical recording medium and for separating the reflected light from the recording medium from the light beam from the light source; and a plurality of photosensing means, arranged almost rectilinearly, for receiving the reflected light from the recording medium which is separated by the beam splitter, wherein among planes of the beam splitter, the plane onto which the light beam which is not led to the optical recording medium in the light beam from the light source is irradiated has a shape adapted to lead the light beam reflected by the plane to the direction which is almost perpendicular to the arrangement direction of the photosensing means.

BRIEF DESCRIPTION OF THE DRAWINGS

FIG. 1 is a diagram for explaining an optical recording and reproducing apparatus in the case when the astigmatism system is used for the focus control and the three-beam is used for the tracking control;

FIG. 2 is a diagram showing photodetectors in the apparatus shown in FIG. 1;

FIGS. 3(a) and 3(b) are diagrams for explaining the relation of the photodetectors and the ghost lights in the apparatus shown in FIG. 1;

DESCRIPTION OF THE PREFERRED EMBODIMENTS

Figure 4:
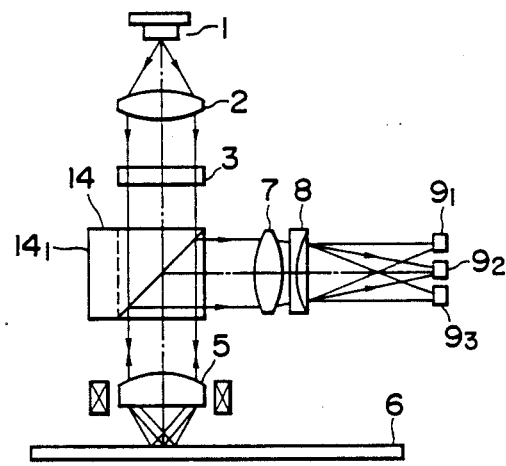
FIG. 4 is a diagram for explaining an optical recording and reproducing apparatus using an optical pickup of the invention.
Figure 5:
FIG. 5 is a diagram showing photodetectors in the apparatus shown in FIG. 4.
Figure 5:
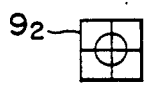
Figure 5:
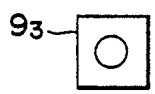

FIGS. 4 and 5 show an optical recording and reproducing apparatus using an optical pickup according to the present invention in the case when the astigmatism system is used for the focus control and the three-beam system is used for the tracking control. In FIG. 4, light fluxes emitted from the semiconductor laser 1 are converted into the parallel light fluxes by the collimator lens 2 and divided into three beams by the diffraction grating 3. The divided light beams are transmitted through a beam splitter 14 and converged onto the disk 6 by the objective lens 5, so that three beam spots are formed. The light beams reflected by the disk 6 again pass through the objective lens 5 and are reflected by the beam splitter 14, so that they are separated from the incident beams. The reflected beams are converged by the condenser lens 7 and cylindrical lens 8 and enter the photodetectors $9_1$, $9_2$, and $9_3$, respectively. The photodetectors $9_1$, $9_2$, and $9_3$ are arranged so as to receive the lights from the three beam spots formed on the disk 6, respectively.

As shown in FIG. 5, the photosensing surface of the photodetector 9 is divided into four areas. By calculating the difference between the sum of the detection signals of a pair of photosensing surfaces which are arranged on a diagonal line and the sum of the detection signals of another pair, the astigmatism caused by the cylindrical lens 8 mentioned above is detected. Thus, the focus control signal is obtained by the well-known principle of the astigmatism system. On the other hand, when the information is reproduced, a reproduction signal is derived from the photodetector $9_2$. On the other hand, the difference between the detection signals of the photodetectors $9_1$ and $9_3$ is calculated and a tracking control signal is derived by the well-known principle of the three-beam system.

In order to prevent ghost lights from entering the photodetectors $9_1$, $9_2$, and $9_3$, a plane $14_1$ opposite to the plane which faces the direction of the photodetectors among six planes constituting the beam splitter 14 is inclined so as to avoid the ghost lights in the direction which is almost perpendicular to the direction of the arrangement of the photodetectors $9_1$, $9_2$, and $9_3$. This function will be described further in detail with reference to FIG. 6.

Figure 6:
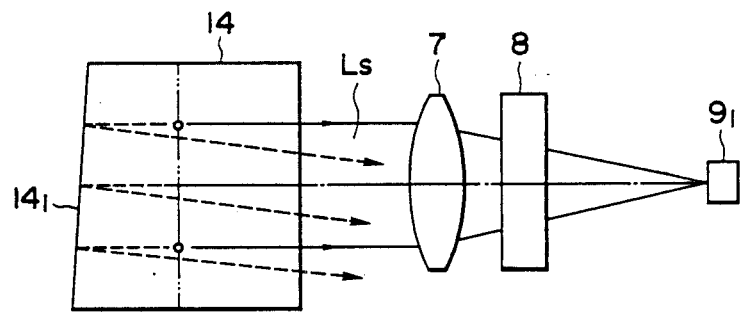
FIG. 6 is a diagram showing a beam splitter in the apparatus shown in FIG. 4.

FIG. 6 is a diagram of the beam splitter 14 shown in FIG. 4 when it is seen from the side of the semiconductor laser 1. Among the light fluxes emitted from the semiconductor laser, the light fluxes reflected by the separating plane of the beam splitter become the ghost lights as shown by broken lines. These ghost lights are again reflected by the plane $14_1$ of the beam splitter. However, the plane $14_1$ is inclined so as to escape the ghost lights in the direction almost perpendicular to the arrangement direction of the photodetectors $9_1$, $9_2$, and $9_3$, namely, it is set to be almost parallel with the arrangement direction of the photodetectors $9_1$, $9_2$, and 9 and is inclined from the direction which is vertical to the optical axis of a signal light $L_s$ directed to the photodetector. Thus, the ghost lights are led in the directions different from the photodetectors and are not mixed with the signal lights.

Figure 7:
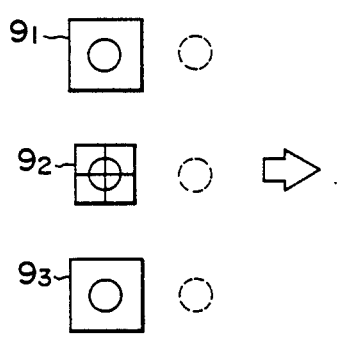
FIG. 7 is a diagram for explaining the relation of the photodetectors and the ghost lights in the apparatus shown in FIG. 4.

FIG. 7 is a diagram of the photodetectors $9_1$, $9_2$, and $9_3$ shown in FIG. 4 when seen from the side of the beam splitter. As will be obvious from the diagram, the plane $14_1$ of the beam splitter is set to be almost parallel with the arrangement direction of the photodetectors and is slightly inclined from the direction which is vertical to the optical axis of the signal light directed to the photodetector, so that the incidence of ghost lights to the photodetectors $9_1$, $9_2$, and $9_3$ can easily be prevented and the S/N ratio in signal detection can be improved.

As described above, according to the invention, the plane $14_1$ of the beam splitter is set to be almost parallel with the arrangement direction of the photodetectors $9_1$, $9_2$, and $9_3$ and is slightly inclined from the direction which is vertical to the optical axis of the light beam entering the plane $14_1$, so that the ghost lights can be easily deviated from the photodetectors $9_1$, $9_2$, and $9_3$. On the other hand, there is no need to largely incline the plane $14_1$ of the beam splitter as shown in FIG. 3(b). The possibility that the light beams reflected by the plane $14_1$ are further reflected by the optical column wall portion and the like on the optical path and irradiated onto the photodetectors $9_1$, $9_2$, and $9_3$, so that they become a cause of the generation of ghost lights is also small.

Figure 8:
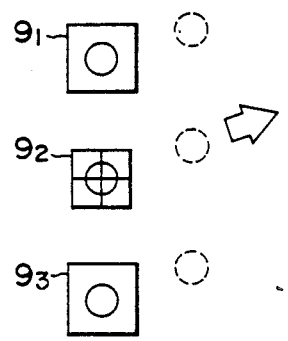
FIG. 8 is a diagram for explaining the relation of the photodetectors and the ghost lights.

On the other hand, the plane $14_1$ of the beam splitter 14 in FIG. 4 has been inclined so as to lead the light beams reflected by this plane to the direction perpendicular to the arrangement direction of the photodetectors $9_1$, $9_2$, and $9_3$. However, even if the inclining direction is slightly deviated as shown in FIG. 8, a similar effect can be expected.

Figure 9:
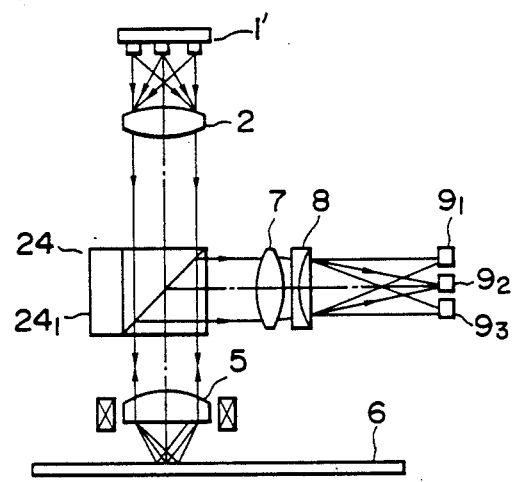
FIG. 9 is a diagram for explaining an optical recording and reproducing apparatus using an optical pickup in another embodiment of the invention.

On the other hand, in the example of FIG. 4, the light fluxes emitted from the semiconductor laser 1 have been separated into three beams by the diffraction grating. However, as shown in FIG. 9, a semiconductor laser array 1' having three light emitting points can also be used. In this case, the number of parts is reduced. A plane $24_1$ of a beam splitter 24 is also obviously inclined so as to lead the light beams reflected by this plane to the direction perpendicular to the arrangement direction of the photodetectors $9_1$, $9_2$, and $9_3$.

Figure 10A:
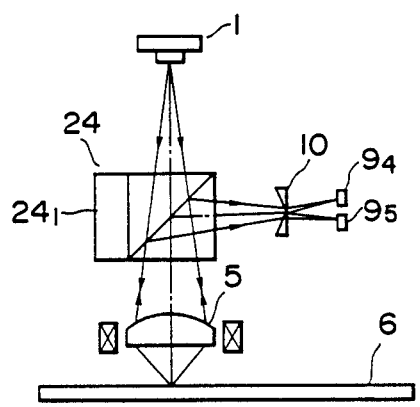
FIG. 10(a) and 10(b) are diagrams for explaining an optical recording and reproducing apparatus using an optical pickup in yet another embodiment of the invention.
Figure 10B:
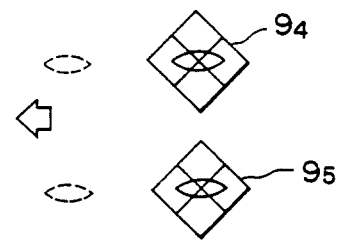

FIGS. 10(a) and 10(b) show another embodiment of the invention. As disclosed in JP-Laid Open Application 146449/1984, the beam reflected by the beam splitter 24 is divided into two beams by a prism 10 and led to photodetectors $9_4$ and $9_5$. The plane $24_1$ of the beam splitter is set to be almost parallel with the arrangement direction of the photodetectors $9_4$ and $9_5$ and is slightly inclined from the direction which is vertical to the optical axis of the reflected light from the disk 6 which was relected by the beam splitter 24. With this structure, the ghost lights generated by the beam splitter 24 can easily be avoided in the direction different from the arrangement direction of the photodetectors $9_4$ and $9_5$.

Figure 11:
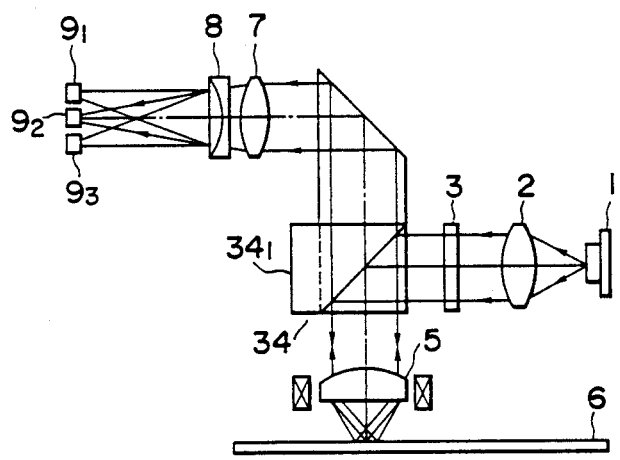
FIG. 11 is a diagram for explaining an optical recording and reproducing apparatus using an optical pickup in a further embodiment of the invention.
Figure 12:
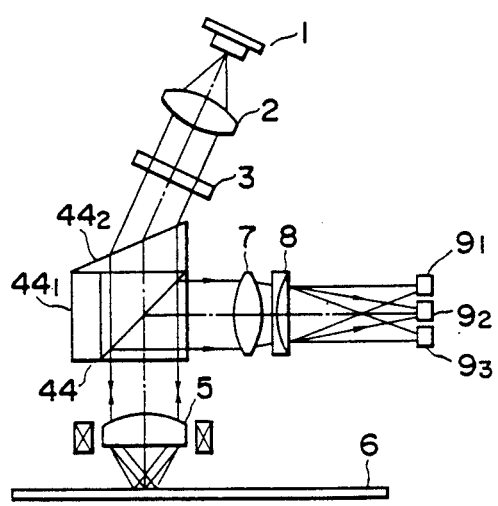
FIG. 12 is a diagram for explaining an optical recording and reproducing apparatus using an optical pickup in yet another embodiment of the invention.

The invention is not limited to the foregoing embodiment and many variations and modifications are possible. For example, as shown in FIG. 11, there is considered a structure in which the light fluxes emitted from the semiconductor laser 1 are reflected by a beam splitter 34 and led onto the disk 6. As shown in FIG. 12, there is also considered an arrangement having the function to prevent a beam splitter 44 from entering ghost lights into the detecting means and also having the function to shape the elliptic beam emitted from the semiconductor laser 1 as a light source to a circular beam. In this case, among the planes of the beam splitter, a plane $44_2$ which faces the light source of the semiconductor laser is set to an angle different from the direction which is vertical to the optical axis of the light beam from the laser light source.

In the foregoing embodiments, the examples of two or three photodetectors which are almost rectilinearly arranged have been described. However, the invention can also be applied to all of the optical pickups having a plurality of photodetectors which are substantially rectilinearly arranged.

In the foregoing embodiments of the invention, the example of the optical disk as an optical recording medium has been described. However, the invention can also be applied to all of the optical pickups for optical recording media such as magnetooptic disk, optical card, digital audio disk, video disk, and the like.

The invention is not limited to the foregoing embodiments and many variations and modifications are possible. FIG. 11 shows the example in which the light fluxes emitted from the semiconductor laser are reflected by the beam splitter and led onto the disk. It is obvious that such an example in which the light beam from the light source is reflected by the beam splitter can also be applied to the apparatus shown in FIGS. 9 and 10, for example, as other embodiments of the invention.

The function of the beam splitter used in the invention can also be applied to a non-polarizing beam splitter which is used in an optical pickup for an optical card, a polarizing beam splitter which is used in an optical pickup for a magnetooptic disk, and the like. Similar effects are also derived. Particularly, since the non-polarizing beam splitter has the transmittance/reflectance characteristics of 50% to the incident light, the generation of ghost lights mentioned above certainly causes a problem. Therefore, it is desirable to use the structure as in the present invention. This point will be described in detail hereinbelow.

Since the optical card-shaped information storage medium (hereinafter, referred to as an optical card) has a card-like shape, it can easily be carried. However, when the optical card is carried or held for a long period of time in a state in which stress is applied to the card, there is a possibility that birefringence, whose states locally differ, occurs in polycarbonate (PC) which is used as a material for a protective layer of the optical card.

If information is reproduced from such an optical card by an optical pickup having an isolating structure consisting of a polarizing beam splitter and a ¼ wavelength plate, an amount of light which reaches the photodetector is influenced by a positional variation of the birefringence state. Thus, it is impossible to discriminate whether the light amount has fluctuated by the inherent information or has fluctuated due to the presence of the birefringence, so that there is an inconvenience of occurrence of erroneous reading. Therefore, a non-polarizing beam splitter is used such that an output of a photodetector is not influenced by a degree of birefringence.

Figure 13:
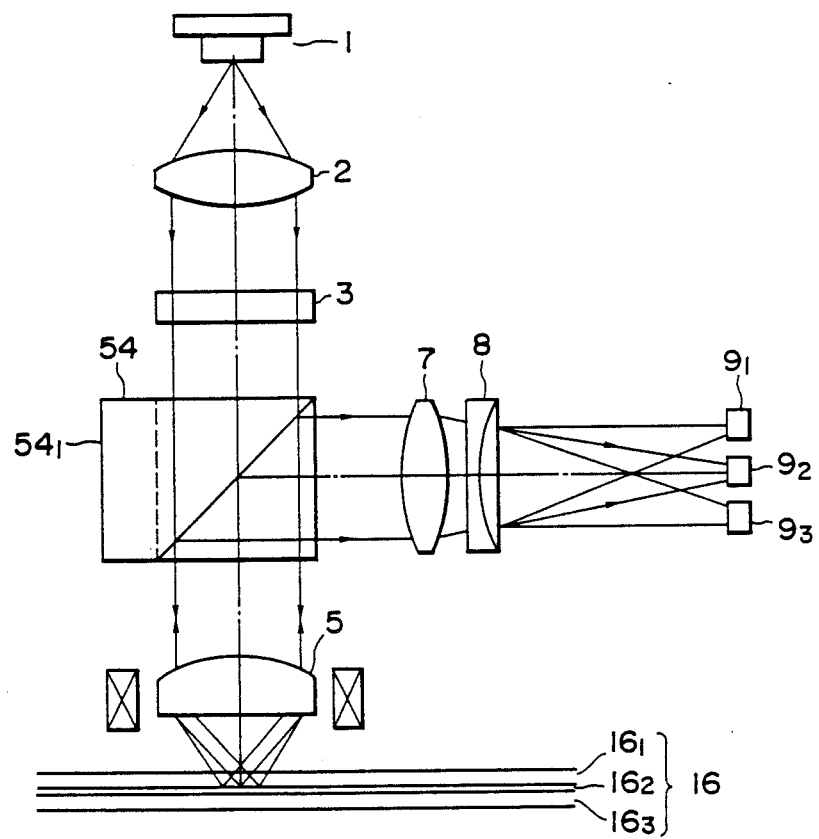
FIG. 13 is a diagram in the case when an optical pickup of the invention is applied to an optical card recording and/or reproducing apparatus.

FIG. 13 is a schematic diagram showing an embodiment in the case when the optical pickup of the invention is applied to an optical card recording and/ or reproducing apparatus. In the diagram, like parts and components as those shown in FIG. 4 are designated by like reference numerals and their detailed descriptions are omitted. Reference numeral 16 denotes an optical card; $16_1$ indicates a transparent protective layer of the optical card 16; $16_2$ an information recording medium layer of the optical card 16; and $16_3$ a supporting substrate of the optical card 16. Similar to the apparatus of FIG. 4, the astigmatism system is used for the focus control and the 3-beam system is used for the tracking control. A plane $54_1$ of a non-polarizing beam splitter 54 is set to be almost parallel with the arrangement direction of the photodetectors $9_1$, $9_2$, and $9_3$ and is inclined from the direction which is vertical to the optical axis of the signal light directed to the photodetector. Therefore, ghost lights generated by the non-polarizing beam splitter 54 are led in the direction different from the photodetectors and are not mixed with the signal lights.

In the case when the light fluxes emitted from the semiconductor laser 1 are transmitted through the non-polarizing beam splitter 54 and are led to the optical card 16, a preferred transmittance characteristic of the non-polarizing beam splitter 54 will now be described.

The following two conditions are considered to preferably perform the recording and reproduction of information into and from the optical card 16.
 (i) The light fluxes emitted from the semiconductor laser 1 are efficiently led to the optical card 16.
 (ii) The reflected light from the optical card is efficiently led to the photodetectors $9_1$, $9_2$, and $9_3$.

These two conditions will be described further in detail using the following equations.

First, assuming that $$T_{ave} = \frac{T_p + T_s}{2}$$

$$R_{ave} = \frac{R_p + R_s}{2}$$

$T_{ave} + R_{ave} = 1$ (no absorption)

Where, $T_p$, $T_s$, $R_p$, $R_s$, $T_{ave}$, and $R_{ave}$ sequentially indicate a transmittance of the P polarization, transmittance of the S polarization, reflectance of the P polarization, reflectance of the S polarization, average of the transmittances of the P polarization and S polarization, and average of the reflectances of the P polarization and S polarization.

On the other hand, $P_s$ indicates an amount of incident light onto the photodetectors.

When the condition of item (i) is expressed by an equation, $$T_{ave} \rightarrow \text{large} \quad (1)$$

When the condition of item (ii) is expressed by an equation, $P_s =$ (amount of light emitted from the semiconductor laser) $\times T_{ave} \times$ (reflectance of the optical card) $\times R_{ave}$ Since the amount of light emitted from the semiconductor laser and the reflectance of the optical card are considered to be constant, $$P_s \propto T_{ave} \times R_{ave} = T_{ave}(1 - T_{ave}) \qquad (2)$$

Figure 14:
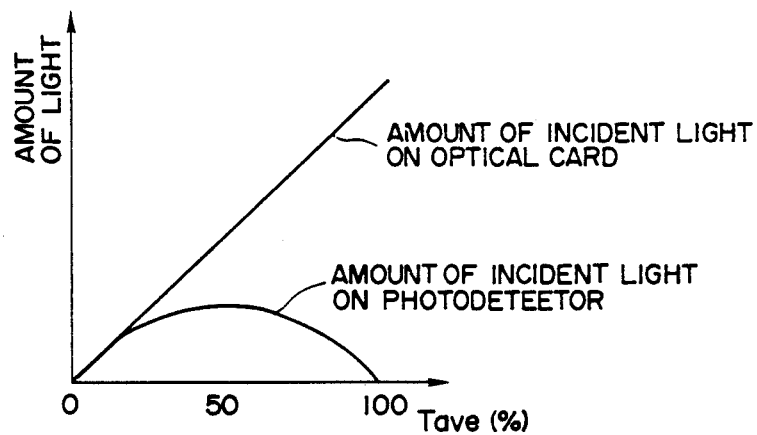
FIG. 14 is a schematic diagram showing the relation of the amount of incident light onto an optical card, the amount of incident light onto a photodetector, and the transmittance of a non-polarizing beam splitter.

FIG. 14 shows the relation of the light amounts of the equations (1) and (2) and the value of $T_{ave}$.

Accordingly, from the two condition (i) and (ii), the desirable transmittance characteristic of the non-polarizing beam splitter is $$30\% \leq T_{ave} \leq 80\%$$

The recording state of the optical card 16 is not determined by only the transmittance characteristic of the non-polarizing beam splitter. It is obvious that this recording state is influenced by various parameters such as output of the semiconductor laser 1, relative speed of the optical card 16 to the optical pickup, size of the beam spot which is formed on the information recording medium layer $16_2$ of the optical card 16, sensitivity of the information recording medium layer $16_2$, and the like. On the other hand, the detecting states of the photodetectors $9_1$, $9_2$, and $9_3$ are not decided by only the transmittance characteristic of the non-polarizing beam splitter. It is apparent that these detecting states are also influenced by various parameters such as sensitivities of the photodetectors, electric circuit which is connected to the photodetectors, and the like. However, when considering the case when the optical pickup having a high reliability is provided at a cost as low as possible as a whole, it is desirable to use the non-polarizing beam splitter in which the transmittance $T_{ave}$ is 30% or more and 80% or less.

A consideration will now be made with regard to the conditions such that the outputs of the photodetectors are hardly influenced by a degree of birefringence of the optical card 16. The amount of incident light to the photodetectors has the maximum and minimum values when the polarizing state of the light which advances from the optical card 16 to the non-polarizing beam splitter 54 is set to the direction which is horizontal and vertical to the rectilinear polarizing direction of the light fluxes emitted from the semiconductor laser 1. In the case of the elliptic polarization and circular polarization, the amount of incident light has an intermediate value between the maximum and minimum values. Therefore, it is sufficient to consider those two typical states. That is, (iii) the state in which, when assuming that the light fluxes emitted from the semiconductor laser 1 are in the P polarization state to the divided surfaces of the non-polarizing beam splitter 54, if no birefringence occurs in the optical card 16, the light fluxes reach the photodetectors in the P polarization state; and (iv) the state in which the P polarization of the light fluxes emitted from the semiconductor laser 1 is influenced by the birefringence of the optical card 16, so that it changes to the S polarization, and the light fluxes in the S polarization state reach the photodetectors.

These two states will be described further in detail by using the following equations.

For convenience of explanation, $P_s$ indicates the amount of incident light onto the photodetectors in the state (iii). At this time, the amount of incident light to the photodetectors has the maximum value. $P_s'$ represents an amount of incident light onto the photodetectors in the state (iv). At this time, the amount of incident light to the photodetectors has the minimum value. Since the other symbols used in the equations have already been described above, their descriptions are omitted here.

First, it is assumed that $$T_p + R_p = 1 \text{ (no absorption)}$$

$$T_s + R_s = 1 \text{ (no absorption)}$$

The state of (iii) is expressed by the following equation.

$P_s = $(amount of light emitted from the semiconductor laser)$\times T_p \times$(reflectance of the optical card)$\times R_p$ Since the amount of light emitted from the semiconductor laser and the reflectance of the optical card are considered to be constants, $$P_s' \propto T_p \times R_p = T_p(1 - T_p) \qquad (3)$$

The state of (iv) is expressed by the following equation.

$P_s = $(amount of light emitted from the semiconductor laser)$\times T_p \times$(reflectance of the optical card)$\times R_s$ Since the amount of light emitted from the semiconductor laser and the reflectance of the optical card are considered to be constants, $$P_s \propto T_p \times R_s = T_p(1 - T_s) \qquad (4)$$

As the condition such that the outputs of the photodetectors are hardly influenced, the relation which is expressed by the following equation is generally satisfied.

$$N \leq 0.1 S \qquad (5)$$

Figure 15:
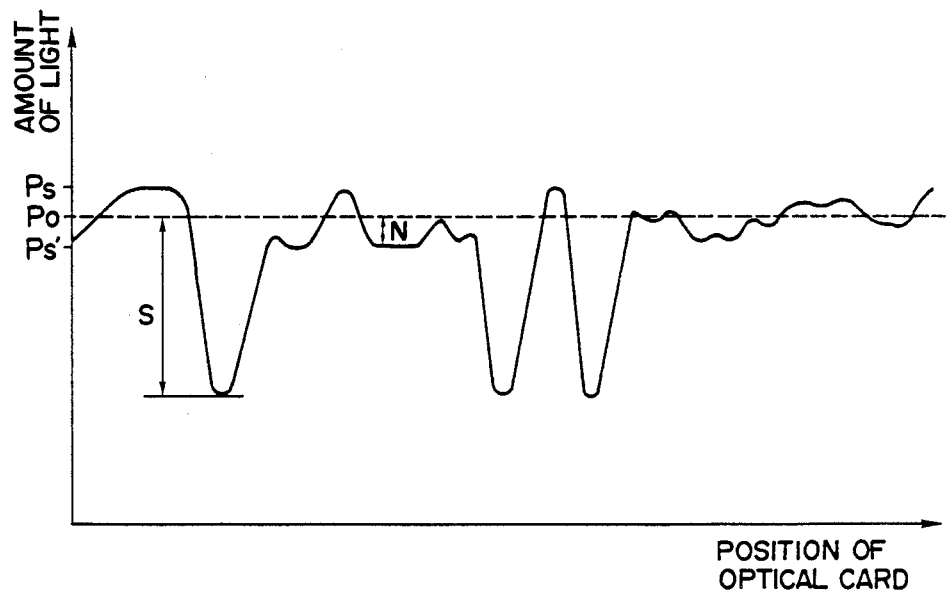
FIG. 15 is a diagram for explaining an influence on an optical card by a birefringence to the amount of incident light onto a photodetector.

As shown in FIG. 15, N denotes the difference between an average light amount $P_o$ (the average of the maximum light amount $P_s$ and the minimum light amount $P_s'$) and the minimum light amount $P_s'$, i.e., the change in light amount due to the influence by the birefringence. On the other hand, S denotes the difference between the average light amount $P_o$ and the light amount when the information pits on the optical card are detected, namely, the change in light amount due to the influence of the information pits on the optical card. The equation (5) is modified hereinbelow. By dividing both sides by $P_o$, we have $$\frac{N}{P_o} \leq 0.1 \frac{S}{P_o}$$

Further, by modifying the left side, $$\frac{|P_s - P_s'|}{2p_o} \leq 0.1 \frac{S}{P_o}$$

$$\frac{|P_s - P_s'|}{P_s + P_s'} \leq 0.1 \frac{S}{P_o}$$

By substituting the equations (3) and (4), $$\frac{|T_p(T_s - T_p)|}{T_p\{2 - (T_p + T_s)\}} \leq 0.1 \frac{S}{P_o} \quad (6)$$
$$= 0.1C$$

$$\left(\text{where, } \frac{S}{P_o} \text{ is defined to a contrast } C\right)$$

Therefore, if the condition indicated by the equation (6) is satisfied, the outputs of the photodetectors are hardly influenced by the degree of the birefringenece of the optical card.

The explanation has been made with respect to the preferred transmittance characteristic of the non-polarizing beam splitter in the case when the light fluxes emitted from the semiconductor laser are transmitted through the non-polarizing beam splitter and led to the optical card. An explanation will now be made hereinbelow with regard to the desirable reflectance characteristic of the non-polarizing beam splitter in the case when the light fluxes emitted from the semiconductor laser are reflected by the non-polarizing beam splitter and led to the optical card.

Figure 16:
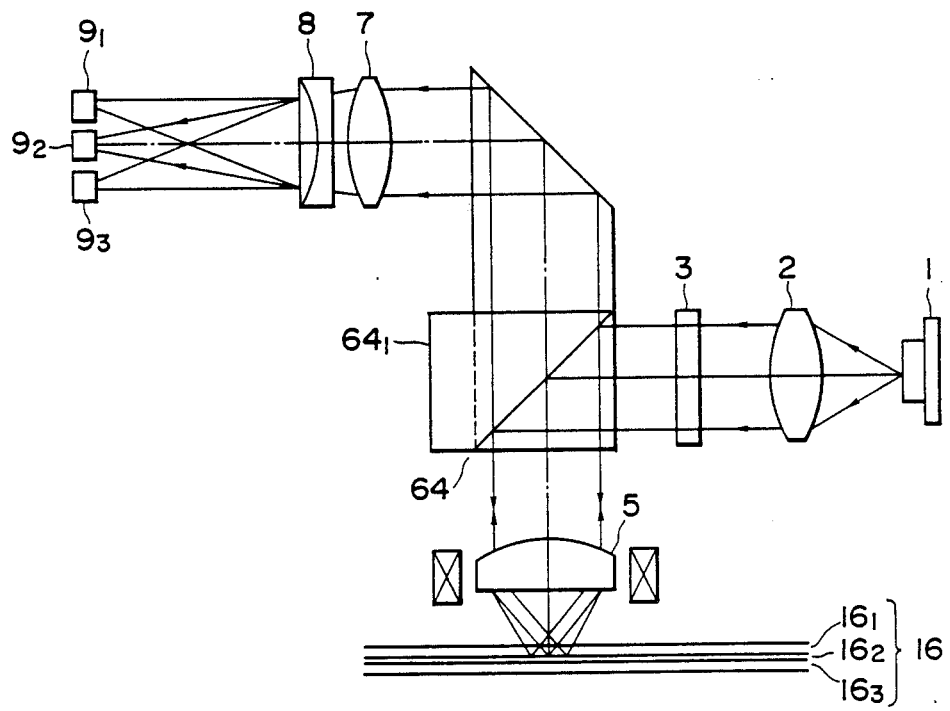
FIG. 16 is a diagram in the case when an optical pickup of the invention is applied to an optical card recording and/or reproducing apparatus.

FIG. 16 is a schematic diagram showing the case when the light fluxes emitted from the semiconductor laser are reflected by a non-polarizing beam splitter 64 and led to the optical card. In the diagram, the same parts and components as those shown in FIG. 11 are designated by the same reference numerals and their detailed descriptions are omitted. On the other hand, similar to the apparatus of FIG. 11, the astigmatism system is used for the focus control and the 3-beam system is used for the tracking control. Obviously, a plane $64_1$ of the non-polarizing beam splitter 64 is inclined from the direction which is vertical to the optical axis of the light beam which enters the plane $64_1$ so as to lead the light beam reflected by the plane $64_1$ to the direction which is almost perpendicular to the arrangement direction of the photodetectors $9_1$, $9_2$, and $9_3$. Thus, the ghost lights which are generated by the non-polarizing beam splitter are led in the direction different from the photodetectors and are not mixed with the signal lights.

The preferred reflectance characteristic of the non-polarizing beam splitter in the case when the light fluxes emitted from the semiconductor laser are reflected by the non-polarizing beam splitter and led to the optical card will now be described.

The following two conditions are considered to preferably perform the recording and reproduction of information into and from the optical card 16.

(v) The light fluxes emitted from the semiconductor laser 1 are efficiently led to the light card 16.
(vi) The light reflected by the optical card 16 is efficiently led to the photodetectors.

These two conditions will be described in further detail by using the following equations.

First, it is assumed that $$T_{ave} = \frac{T_p + T_s}{2}$$

$$R_{ave} = \frac{R_p + R_s}{2}$$

$T_{ave} + R_{ave} = 1$ (no absorption)

Since the symbols used in the equations have already been described above, their descriptions are omitted here.

The conditions of (v) are expressed by the following equation.

$$R_{ave} \to \text{large} \quad (7)$$

The condition of (vi) is expressed by the following equation.

$P_s = $ (amount of light emitted from the semiconductor laser)$\times R_{ave} \times$ (reflectance of the optical card)$\times T_{ave}$ Since the amount of light emitted from the semiconductor laser and the reflectance of the optical card are considered to be constants, $$P_s \propto R_{ave} \times T_{ave} = R_{ave}(1 - R_{ave}) \quad (8)$$

Figure 17:
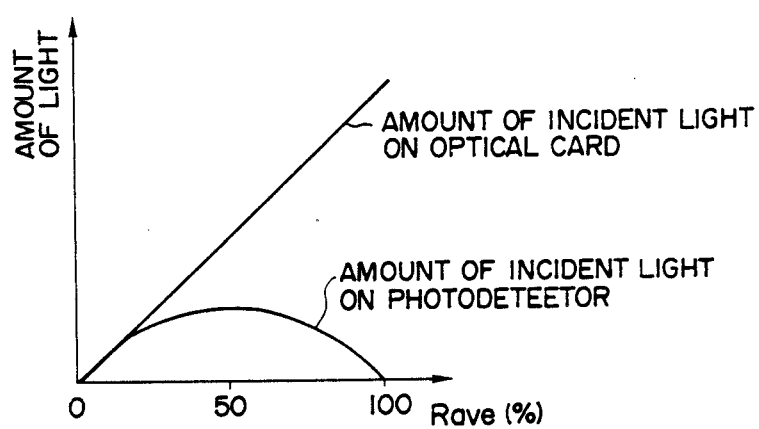
FIG. 17 is a schematic diagram showing the relation of the amount of incident light onto an optical card, the amount of incident light onto a photodetector, and the reflectance of a non-polarizing beam splitter.

FIG. 17 shows the relations among the light amounts in the equations (7) and (8) and the value of $R_{ave}$.

Therefore, from the two conditions (v) and (vi), the preferred reflectance characteristic of the non-polarizing beam splitter is $$30\% \leq R_{ave} \leq 80\%$$

Obviously, the recording state of the optical card 16 is not determined by only the reflectance characteristic of the non-polarizing beam splitter. It is apparent that this recording state is influenced by various parameters such as output of the semiconductor laser 1, relative speed of the optical card 16 to the optical pickup, size of the beam spot which is formed on the information recording medium layer $16_2$ of the optical card 16, sensitivity of the information recording medium layer 162, and the like. On the other hand, the detecting states of the photodetectors are not decided by only the reflectance characteristic of the non-polarizing beam splitter. It is obvious that these detecting states are influenced by various parameters such as sensitivities of the photodetectors, electric circuit connected to the photodetectors, and the like. However, when considering the case where the optical pickup having a high reliability is provided at a cost as low as possible as a whole, it is desirable to use the non-polarizing beam splitter in which the reflectance $R_{ave}$ is 30% or more and 80% or less.

The conditions such that the outputs of the photodetectors are hardly influenced by the degree of the birefringence of the optical card 16 will now be considered. The amount of light entering the photodetector has the maximum value and minimum value when the polarizing state of the light which advances from the optical card 16 to the non-polarizing beam splitter 64 is set to the direction which is horizontal and vertical to the rectilinear polarizing direction of the light fluxes emitted from the semiconductor laser 1. In the case of the elliptic polarization and circular polarization, the light amount has an intermediate value between the maximum and minimum values. Therefore, it is sufficient to consider those two typical states. That is, (vii) the state in which it is assumed that the light fluxes emitted from the semiconductor laser 1 are in the state of the P polarization to the divided surfaces of the non-polarizing beam splitter 64, if no birefringence occurs in the optical card 16, the light fluxes reach the photodetectors in the state of the P polarization; and (viii) the state in which the P polarization of the light fluxes emitted from the semiconductor laser 1 is influenced by the birefringence of the optical card 16, so that they change to the S polarization and reach the photodetector in the S polarization state.

These two states will be explained further in detail by using the following equations.

For convenience of explanation, $P_s$ denotes the amount of incident light onto the photodetector in the state of (vii) and at this time, the amount of incident light to the photodector has the maximum value, $P_s'$ indicates the amount of incident light to the photodetector in the state of (iv) and at this time, the amount of incident light to the photodetector has the minimum value. Since the other symbols used in the equations have already been described above, their descriptions are omitted here.

First, it is assumed that $$T_p + R_p = 1 \text{ (no absorption)}$$

$$T_s + R_s = 1 \text{ (no absorption)}$$

The state of (vii) is expressed by the following equation.

$P_s =$ (amount of light emitted from the semiconductor laser) $\times R_p \times$ (reflectance of the optical card) $\times T_p$ Since the amount of light emitted from the semiconductor laser and the reflectance of the optical card are considered to be constants, $$P_s \propto R_p \times T_p = R_p(1 - R_p) \quad (9)$$

The state of (viii) is expressed by the following equation.

$P_s' =$ (amount of light emitted from the semiconductor laser) $\times R_p \times$ (reflectance of the optical card) $\times T_s$ Since the amount of light emitted from the semiconductor laser and the reflectance of the optical card are considered to be constants, $$P_s' \propto R_p \times T_s = R_p(1 - R_s) \quad (10)$$

As the conditions such that the outputs of the photodetectors are hardly influenced, the relation which is expressed by the following equation is generally satisfied.

$$N \leq 0.1S \quad (5)$$

As shown in FIG. 15, N indicates the difference between the average light amount $P_o$ (the average of the maximum and minimum light amounts $P_s$ and $P_s'$) and the minimum light amount $P_s'$, namely, the change in light amount due to the influence by the birefringence. On the other hand, S represents the difference between the average light amount $P_o$ and the light amount when the information pits on the optical card are detected, that is, the change in light amount due to the influence by the information pits on the optical card. The equation (5) is modified hereinbelow. By dividing both sides by $P_o$, we have $$\frac{N}{P_o} \leq 0.1 \frac{S}{P_o}$$

Further, by modifying the left side, $$\frac{|P_s - P_s'|}{2P_o} \leq 0.1 \frac{S}{P_o}$$

$$\frac{|P_s - P_s'|}{P_s + P_s'} \leq 0.1 \frac{S}{P_o}$$

By substituting the equations (9) and (10), $$\frac{|R_p(R_s - R_p)|}{R_p\{2 - (R_p + R_s)\}} \leq 0.1 \frac{S}{P_o} \quad (11)$$

$$= 0.1C$$

Therefore, if the condition shown in the equation (11) is satisfied, the outputs of the photodetectors are hardly influenced by the degree of the birefringence of the optical card.

Figure 18A:
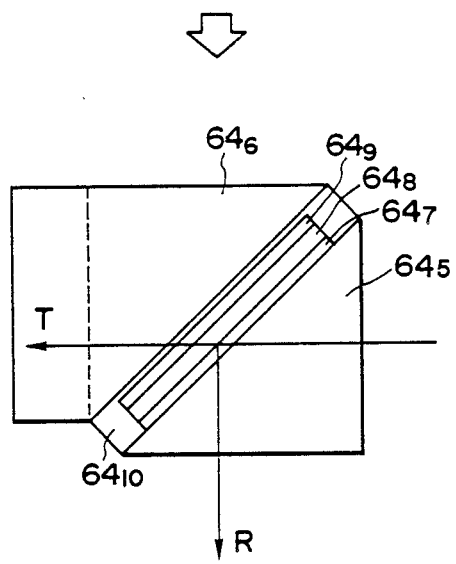
FIGS. 18(a) and 18(b) are enlarged diagrams showing a non-polarizing beam splitter in the apparatus shown in FIG. 16.
Figure 18B:
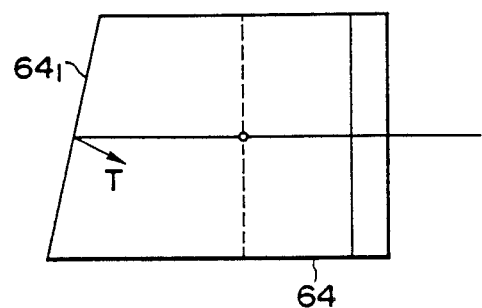

On the other hand, FIGS. 18(a) and 18(b) are enlarged diagrams showing only the non-polarizing beam splitter in the apparatus shown in FIG. 16. FIG. 18(a) is a cross sectional diagrammatical view in the plane including the optical axis of the light fluxes emitted from the semiconductor laser and the optical axis of the light fluxes reflected by the optical card. FIG. 18(b) is a schematic diagram showing the non-polarizing beam splitter when it is seen from the side of the photodetectors (in the direction indicated by an arrow in the diagram).

In FIG. 18(a), reference numerals $64_5$ and $64_6$ denote prisms. A thin dielectric film $64_7$, a silver film $64_8$, and a thin dielectric film $64_9$ are sequentially evaporation deposited onto the slant plane of the prism $64_5$ and are adhered to the prism $64_6$ by an adhesive agent $64_{10}$. On the other hand, as shown in FIG. 18(b), the plane $64_1$ of the non-polarizing beam splitter is inclined from the direction which is vertical to the optical axis of the light beam which enters the plane $64_1$ so as to lead the light beam reflected by the plane $64_1$ to the direction which is almost perpendicular to the arrangement direction of the photodetectors. Therefore, the ghost lights generated by the non-polarizing beam splitter are led in the direction different from the photodetectors and are not mixed with the signal lights.

Figure 19:
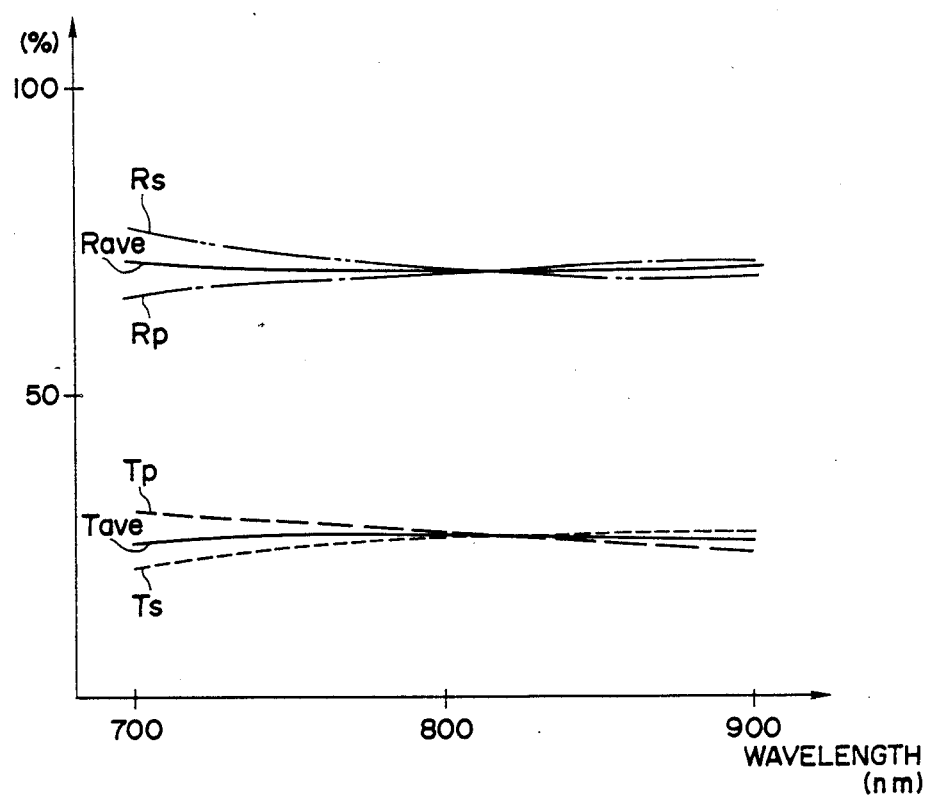
FIGS. 19 and 20 show spectrum characteristic diagrams of a non-polarizing beam splitter which is used in an optical pickup of the invention.
Figure 20:
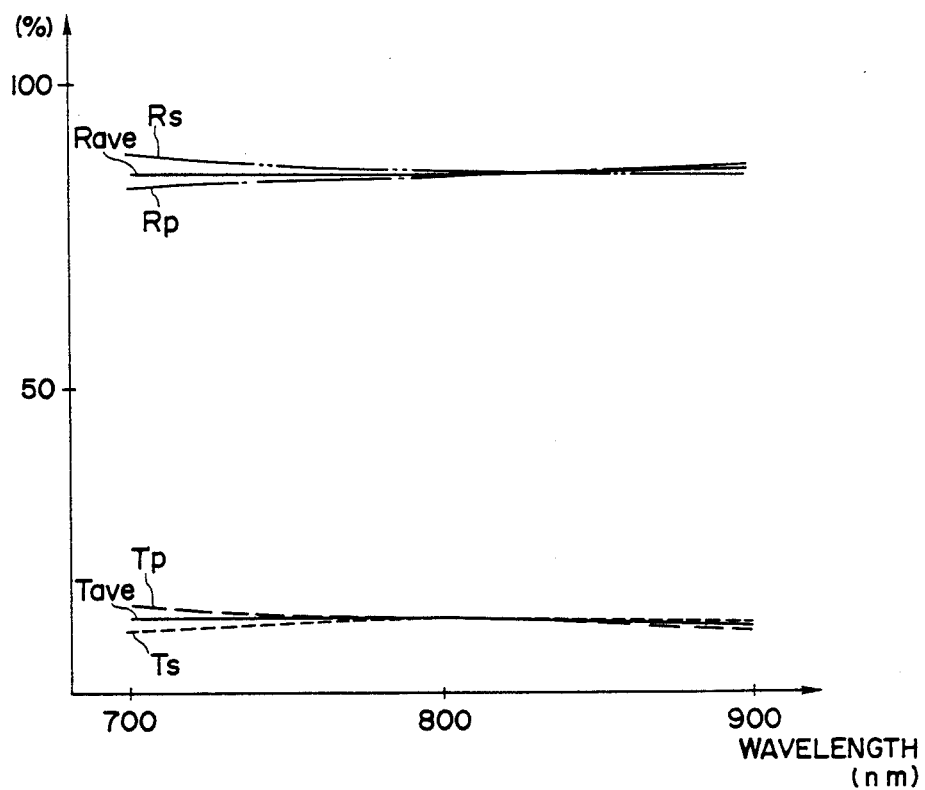

Two examples of the actual film structure of the non-polarizing beam splitter 64 for reflecting the light fluxes emitted from the semiconductor laser and leading to the optical card are shown. FIG. 19 shows a spectrum characteristic diagram of the film structure consisting of the thin dielectric films $64_7$ and $64_9$ made of zirconium oxide, each having an optical film thickness of 245 nm and the silver film $64_8$ having a geometric film thickness of 24 nm. In FIG. 19, $R_s$, $R_p$, $T_s$, and $T_p$ sequentially indicate the reflectance of the S component, reflectance of the P component, transmittance of the S component, and transmittance of the P component. $R_A$ represents an average value of the reflectances of the S and P components. $T_A$ denotes an average value of the transmittances of the S and P components. FIG. 20 shows a spectrum characteristic diagram of the film structure consisting of the thin dielectric films $64_7$ and $64_9$ made of zirconium oxide, each having an optical film thickness of 245 nm and the silver film $64_8$ having a geometric film thickness of 34 nm. Since the symbols used in the diagrams have already been described above, their descriptions are omitted here.

In the optical recording medium such as an optical card on which information is recorded in the form of pits as the example, the explanation has been made with regard to the transmittance/reflectance characteristics to perform good recording and reproduction of information into and from the optical recording medium in the case of using the non-polarizing beam splitter and the transmittance/reflectance characteristic such that the outputs of the photodetectors are hardly influenced by the degree of birefringence of the optical recording medium. However, similar descriptions can also be performed for a magnetooptic recording medium.

In the case of the magnetooptic recording medium, information is recorded by the difference of the magnetic directions as in a magnetic bubble memory. Therefore, it is sufficient to consider that the portion where information has been recorded and the magnetic directiion has been inverted as compared with the other portions corresponds to an information pit as in the foregoing optical card.

On the other hand, in the semiconductor laser of the light source as the example, the explanation has been made with regard to the transmittance/reflectivity characteristics to perform good recording and reproduction of information into and from the optical recording medium in the case of using the non-polarizing beam splitter and the transmittance/reflectance characteristics such that the outputs of the photodetectors are hardly influenced by the degree of birefringence of the optical recording medium. However, the same explanation can also be similarly performed for a light source to generate a light beam polarized in a predetermined direction.

What is claimed is:

1. An optical pickup apparatus comprising:
   a light source for generating a light beam which is irradiated onto an optical recording medium;
   a beam splitter, arranged on an optical path from said light source to the optical recording medium, comprising a junction of a plurality of prisms, for transmitting the light beam from said light source leading to the optical recording medium, and for separating light reflected from the recording medium from the light beam generated from said light source; and
   a plurality of photosensing means, arranged substantially rectilinearly, for receiving the reflected light from the recording medium which is separated by said beam splitter,
   wherein among planes of said beam splitter, the plane opposite to the plane which faces the direction of said photosensing means directs the light beam reflected by that plane in a direction substantially perpendicular to the arrangement direction of said photosensing means.

2. An optical pickup apparatus according to claim 1, further comprising dividing means, arranged on the optical path from said light source to the optical recording medium, for dividing the light beam generated from said light source into a plurality of light beams.

3. An optical pickup apparatus according to claim 1, further comprising dividing means, arranged on an optical path from said beam splitter to the photosensing means, for dividing the reflected light from the recording medium, which is separated by said beam splitter, into a plurality of light beams.

4. An optical pickup apparatus according to claim 1, wherein among the planes of said beam splitter, the plane which faces said light source is set to an angle different from a direction orthogonal to the optical axis of the light beam generated from said light source.

5. An optical pickup apparatus according to claim 1, wherein said light source comprises means for generating a plurality of light beams.

6. An optical pickup apparatus according to claim 1, wherein said beam splitter comprises a polarizing beam splitter.

7. An optical pickup apparatus according to claim 1, wherein said beam splitter comprises a non-polarizing beam splitter.

8. An optical pickup apparatus comprising:
   a light source for generating a light beam which is irradiated onto an optical recording medium;
   a beam splitter, arranged on an optical path from said light source to the optical recording medium, comprising a junction of a plurality of prisms, for reflecting the light beam from said light source leading to the optical recording medium, and for separating light reflected from the recording medium from the light beam generated from said light source; and
   a plurality of photosensing means, arranged substantially rectilinearly, for receiving the reflected light from the recording medium which is separated by said beam splitter,
   wherein among planes of said beam splitter, the plane opposite to the plane which faces the direction of said light source directs the light beam reflected by that plane in a direction substantially perpendicular to the arrangement direction of the photosensing means.

9. An optical pickup apparatus according to claim 8, further comprising dividing means, arranged on the optical path from said light source to the optical recording medium, for dividing the light beam from said light source into a plurality of light beams.

10. An optical pickup apparatus according to claim 8, further comprising dividing means, arranged on an optical path from said beam splitter to the photosensing means, for dividing the reflected light from the recording medium, which is separated by said beam splitter, into a plurality of light beams.

11. An optical pickup apparatus according to claim 8, wherein among the planes of said beam splitter, the plane which faces said light source is set to an angle different from a direction orthogonal to the optical axis of the light beam generated from said light source.

12. An optical pickup apparatus according to claim 8, wherein said light source comprises means for generating a plurality of light beams.

13. An optical pickup apparatus according to claim 8, wherein said beam splitter comprises a polarizing beam splitter.

14. An optical pickup apparatus according to claim 8, wherein said beam splitter comprises a non-polarizing beam splitter.

15. An optical pickup apparatus comprising:
   a light source for generating a light beam which is irradiated onto an optical recording medium;
   a beam splitter, arranged on an optical path from said light source to the optical recording medium, comprising a junction of a plurality of prisms, for separating light reflected from the recording medium from the light beam generated from said light source; and a plurality of photosensing means, arranged substantially rectilinearly, for receiving the light reflected from the recording medium which is separated by said beam splitter, wherein among planes of said beam splitter, the plane opposite to the plane which faces the direction of said photosensing means is substantially parallel to the arrangement direction of said photosensing means and is set to an angle different from a direction orthogonal to an optical axis of the separated reflected light.

16. An optical pickup apparatus comprising:

a light source for generating a light beam which is irradiated onto an optical recording medium;

a beam splitter, arranged on an optical path from said light source to the optical recording medium, for leading the light beam generated from said light source to the optical recording medium and for separating light reflected from the recording medium from the light beam generated from said light source; and a plurality of photosensing means, arranged rectilinearly, for receiving the reflected light from the recording medium which is separated by said beam splitter, wherein among planes of said beam splitter, a plane, onto which a light beam generated from said light source is irradiated without irradiating the optical recording medium, directs a light beam reflected by that plane in a direction substantially perpendicular to the arrangement direction of said photosensing means.

17. An optical pickup apparatus comprising:

a light source for generating a light beam which is irradiated onto an optical recording medium;

a beam splitter, arranged on an optical path from said light source to the optical recording medium, comprising a junction of a plurality of prisms for transmitting the light beam from said light source leading to the optical recording medium and for separating a light beam reflected from the recording medium from the light beam generated by said light source;

an optical system for converging the light beam reflected from the optical recording medium; and a plurality of photosensing means arranged substantially rectilinearly for receiving the light beam converged by said optical system, wherein among planes of said beam splitter, the plane opposite to the plane which faces the direction of said photosensing means directs the light beam reflected by that plane in a direction different from the arrangement direction of said plurality of photosensing means and different from the plane including an optical axis of said optical system.

18. An optical pickup apparatus according to claim 17, further comprising dividing means, arranged on the optical path from said light source to the optical recording medium, for dividing the light beam generated from said light source into a plurality of light beams.

19. An optical pickup apparatus according to claim 17, further comprising dividing means, arranged on an optical path from said beam splitter to said photosensing means, for dividing the light reflected from the recording medium and separated by said beam splitter into a plurality of light beams.

20. An optical pickup apparatus according to claim 17, wherein among the planes of said beam splitter, the plane which faces said light source is set to an angle different from a direction orthogonal to the optical axis of the light beam generated by said light source.

21. An optical pickup apparatus according to claim 17, wherein said light source comprises means for generating a plurality of light beams.

22. An optical pickup apparatus according to claim 17, wherein said beam splitter comprises a polarizing beam splitter.

23. An optical pickup apparatus according to claim 17, wherein said beam splitter comprises a non-polarizing beam splitter.

24. An optical pickup apparatus comprising:

a light source for generating a light beam which is irradiated onto an optical recording medium;

a beam splitter, arranged on an optical path from said light source to the optical recording medium, comprising a junction of a plurality of prisms, for reflecting the light beam from said light source leading to the optical recording medium and for separating a light beam reflected from the recording medium from the light beam generated by said light source;

an optical system for converging the light beam reflected from the recording medium; and a plurality of photosensing means arranged substantially rectilinearly for receiving the light beam converged by said optical system, wherein among planes of said beam splitter, the plane opposite to the plane which faces the direction of said light source directs the light beam reflected by that plane in a direction different from the arrangement direction of said plurality of photosensing means and different from the plane including the optical axis of said optical system.

25. An optical pickup apparatus according to claim 24, further comprising dividing means, arranged on the optical path from said light source to the optical recording medium, for dividing the light beam from said light source into a plurality of light beams.

26. An optical pickup apparatus according to claim 24, further comprising dividing means, arranged on an optical path from said beam splitter to said photosensing means, for dividing the light reflected from the recording medium and separated by said beam splitter into a plurality of light beams.

27. An optical pickup apparatus according to claim 24, wherein among the planes of said beam splitter, the plane which faces said light source is set to an angle different from a direction orthogonal to the optical axis of the light beam generated by said light source.

28. An optical pickup apparatus according to claim 24, wherein said light source comprises means for generating a plurality of light beams.

29. An optical pickup apparatus according to claim 24, wherein said beam splitter comprises a polarizing beam splitter.

30. An optical pickup apparatus according to claim 24, wherein said beam splitter comprises a non-polarizing beam splitter.

31. An optical pickup apparatus comprising:

a light source for generating a light beam which is irradiated onto an optical recording medium;

a beam splitter, arranged on an optical path from said light source to the optical recording medium, for leading the light beam generated from said light source to the optical recording medium and for separating a light beam reflected from the recording medium from the light beam generated by said light source;

an optical system for converging the light beam reflected from the recording medium; and a plurality of photosensing means arranged substantially rectilinearly for receiving the light beam converged by said optical system, wherein among planes of said beam splitter, a plane, onto which a light beam generated from said light source is irradiated without irradiating the optical recording medium, directs a light beam reflected by that plane in a direction different from the arrangement direction of said plurality of photosensing means and different from the plane including the optical axis of said optical system.

32. An optical recording/reproducing apparatus comprising:

a light source for generating a light beam which is irradiated onto an optical recording medium;

a beam splitter, arranged on an optical path from said light source to the optical recording medium, comprising a junction of a plurality of prisms for transmitting the light beam from said light source and leading to the optical recording medium and for separating a light beam reflected from the recording medium from the light beam generated by said light source;

an optical system for converging the light beam reflected from the recording medium; and a plurality of photosensing means arranged substantially rectilinearly for receiving the light beam converged by said optical system, at least one of said plurality of photosensing means receiving a reproducing signal, wherein among planes of said beam splitter, the plane opposite to the plane which faces the direction of said photosensing means directs the light beam reflected by that plane in a direction different from the arrangement direction of said plurality of photosensing means and different from the plane including the optical axis of said optical system.

33. An optical recording/reproducing apparatus comprising:

a light source for generating a light beam which is irradiated onto an optical recording medium;

a beam splitter, arranged on an optical path from said light source to the optical recording medium, comprising a junction of a plurality of prisms for reflecting the light beam from said light source leading to the optical recording medium and for separating a light beam reflected from the recording medium from the light beam generated by said light source;

an optical system for converging the light beam reflected from the recording medium; and a plurality of photosensing means arranged substantially rectilinearly for receiving the light beam converged by said optical system, at least one of said plurality of photosensing means receiving a reproducing signal, wherein among planes of said beam splitter, the plane opposite to the plane which faces the direction of said light source directs the light beam reflected by that plane in a direction different from the arrangement direction of said plurality of photosensing means and different from the plane including the optical axis of said optical system.

34. An optical recording/reproducing apparatus comprising:

a light source for generating a light beam which is irradiated onto an optical recording medium;

a beam splitter, arranged on an optical path from said light source to the optical recording medium, for leading the light beam generated from said light source to the optical recording medium and for separating a light beam reflected from the recording medium from the light beam generated by said light source;

an optical system for converging the light beam reflected from the recording medium; and a plurality of photosensing means arranged substantially rectilinearly for receiving the light beam converged by said optical system, at least one of said plurality of photosensing means receiving a reproducing signal, wherein among planes of said beam splitter, a plane, onto which a light beam generated from said light source is irradiated without irradiating the recording medium, directs a light beam reflected by that plane in a direction different from the arrangement direction of said plurality of photosensing means and different from the plane including the optical axis of said optical system.

* * * * *

UNITED STATES PATENT AND TRADEMARK OFFICE
CERTIFICATE OF CORRECTION

PATENT NO. : 4,973,836            Page 1 of 2
DATED : November 27, 1990
INVENTOR(S) : Kazuhiko Matsuoka It is certified that error appears in the above-identified patent and that said Letters Patent is hereby corrected as shown below:

IN THE DRAWINGS

In Fig. 14, "PHOTODETEETOR" should read --PHOTODETECTOR--; and
In Fig. 17, "PHOTODETEETOR" should read --PHOTODETECTOR--.

COLUMN 4

Line 16, "beam" should read --beam,--;
Line 17, "source" should read --source,--; and
Line 18, "ated" should read --ated,--.

COLUMN 5

Line 38, "photodetector 9" should read --photodetector $9_2$--.

COLUMN 6

Line 4, "and 9" should read --and $9_3$--; and
Line 33, "lights" should read --lights,--.

COLUMN 8

Line 32, "optical card" should read --optical card 16--.

UNITED STATES PATENT AND TRADEMARK OFFICE
CERTIFICATE OF CORRECTION

PATENT NO. : 4,973,836

DATED : November 27, 1990

INVENTOR(S) : Kazuhiko Matsuoka

It is certified that error appears in the above-identified patent and that said Letters Patent is hereby corrected as shown below:

COLUMN 9

Line 6, "condition" should read --conditions--.

COLUMN 10

Line 26, "$P_s=$" should read --$P_s^1=$--; and

Line 33, "$P_s \propto$" should read --$P_s^1 \propto$--.

COLUMN 12

Line 37, "layer 162," should read --layer $16_2$,--.

COLUMN 13

Line 8, "further in" should read --in further--.

COLUMN 14

Line 21, insert, as a new line, --(where, $\frac{S}{P_0}$ is defined to the contrast C)--.

Signed and Sealed this

Twenty-fifth Day of August, 1992

*Attest:*

DOUGLAS B. COMER

*Attesting Officer*  *Acting Commissioner of Patents and Trademarks*